(12) United States Patent
Matthews et al.

(10) Patent No.: US 10,858,069 B2
(45) Date of Patent: *Dec. 8, 2020

(54) MARINE VESSEL HULL WITH A LONGITUDINALLY VENTED TRANSVERSE STEP

(71) Applicant: Cross Step LLC, Yeadon, PA (US)

(72) Inventors: Stephen Daniel Matthews, Stuart, FL (US); John Joseph Gazza, Farmingdale, NY (US)

(73) Assignee: Cross Step LLC, Yeadon, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,493

(22) Filed: Feb. 18, 2019

(65) Prior Publication Data

US 2019/0176934 A1    Jun. 13, 2019

Related U.S. Application Data (63) Continuation of application No. 15/145,866, filed on May 4, 2016, now Pat. No. 10,246,162, which is a
(Continued)

(51) Int. Cl.
  *B63B 1/38* (2006.01)
  *B63B 1/04* (2006.01)
  *B63B 1/10* (2006.01)

(52) U.S. Cl.
  CPC ............ *B63B 1/38* (2013.01); *B63B 1/042* (2013.01); *B63B 1/10* (2013.01); *B63B 2001/387* (2013.01); *Y02T 70/122* (2013.01)

(58) Field of Classification Search
  CPC .. B63B 1/38; B63B 1/042; B63B 1/10; B63B 2001/387; B63B 1/32; B63B 1/34; B63B 1/36; B63B 2001/385; Y02T 70/122
  See application file for complete search history.

(56) References Cited

U.S. PATENT DOCUMENTS

| 1,050,517 A | 1/1913 | Chase |
| 1,935,622 A | 11/1933 | Eddy |

(Continued)

FOREIGN PATENT DOCUMENTS

| GB | 2069415 A | 8/1981 |
| KR | 1020070045886 A | 5/2007 |

OTHER PUBLICATIONS

International Search Report and Written Opinion for International Application No. PCT/US2015/059508, dated Jan. 14, 2016—8 pages.
(Continued)

*Primary Examiner* — Anthony D Wiest
(74) *Attorney, Agent, or Firm* — RatnerPrestia (57) ABSTRACT

A marine vessel hull, and marine vessels comprising at least one such hull, comprising a non-entrapment hull having at least one longitudinally vented transverse step, each longitudinally vented transverse step comprising a transverse step, and one or more longitudinal steps extending forward therefrom. Each longitudinal step portion has a cross-sectional profile defining a cutout into the hull relative to a line defined by a deadrise angle of the hull. The cutout defines a vertical rise starting from the line defined by the deadrise angle and a run tilted outwardly upward at a non-horizontal angle less than the deadrise angle and that extends to an intersection with the line defined by the deadrise angle.

21 Claims, 6 Drawing Sheets

Related U.S. Application Data continuation-in-part of application No. PCT/US2015/059508, filed on Nov. 6, 2015.

(60) Provisional application No. 62/076,831, filed on Nov. 7, 2014.

(56) References Cited

U.S. PATENT DOCUMENTS

| | | | |
|---|---|---|---|
| 2,044,771 A | 3/1936 | Carr | |
| 3,113,543 A | 12/1963 | Brownback | |
| 3,237,581 A | 3/1966 | Moesly | |
| 3,316,874 A | 5/1967 | Canazzi | |
| 3,604,385 A | 9/1971 | Reider | |
| 4,231,314 A | 11/1980 | Peters | |
| 4,494,477 A | 1/1985 | Matthews | |
| 4,702,188 A | 10/1987 | Harilainen | |
| 4,753,184 A | 6/1988 | Shiavone | |
| 4,989,534 A | 2/1991 | Field | |
| 5,452,676 A | 9/1995 | Fiore | |
| 6,176,196 B1 | 1/2001 | Halter | |
| 6,415,731 B2 | 7/2002 | Chrunyk | |
| 6,666,160 B1 | 12/2003 | Örneblaci | |
| 6,868,798 B2 | 3/2005 | Robinson et al. | |
| 6,923,137 B2 | 8/2005 | Waits | |
| 6,925,953 B1 | 8/2005 | Batista et al. | |
| 6,983,713 B1 | 1/2006 | Robinson et al. | |
| 7,549,385 B2 | 6/2009 | Hansen et al. | |
| 7,677,192 B2 | 3/2010 | Scism et al. | |
| 7,992,507 B2 | 6/2011 | Adams | |
| 8,201,513 B2 | 6/2012 | Hansen et al. | |
| 8,210,116 B2 | 7/2012 | Campbell et al. | |
| 8,240,268 B2 | 8/2012 | Hansen | |
| 8,291,850 B1 | 10/2012 | Peters | |
| 8,701,583 B2 | 4/2014 | Boschoff et al. | |
| 9,162,732 B2 | 10/2015 | Torres et al. | |
| 2005/0016435 A1 | 1/2005 | Robinson et al. | |
| 2007/0039536 A1 | 2/2007 | Kalil | |
| 2007/0245944 A1 | 10/2007 | Scism et al. | |
| 2011/0056425 A1 | 3/2011 | Campbell et al. | |
| 2012/0042820 A1 | 2/2012 | Brekke | |
| 2012/0291686 A1 | 11/2012 | Loui et al. | |
| 2014/0102349 A1 | 4/2014 | Abella et al. | |
| 2015/0329178 A1 | 11/2015 | Loui et al. | |

OTHER PUBLICATIONS

Peters, M., "Peters on (Fast) Powerboats," Nov./Dec. 2010, pp. 56-71, Professional BoatBuilder, URL: https://proboat.com/wp-content/uploads/2011/04/hispeedpower127low.pdf.

Teale, J., "Design a Boat: Painting, Varnishing, Antifouling", Adlard Coles Nautical, London, 2011-17 pages.

Entire patent prosecution history of U.S. Appl. No. 15/145,866, filed May 4, 2016, entitled "Marine Vessel Hull With a Longitudinally Vented Transverse Step."

MARINE VESSEL HULL WITH A LONGITUDINALLY VENTED TRANSVERSE STEP

CROSS REFERENCE TO RELATED APPLICATIONS

This application claims priority from U.S. application Ser. No. 15/145,866, (status: Allowed), filed May 4, 2016, which is a continuation-in-part (cm) of PCT Application Ser. No. PCT/US2015/059508, filed Nov. 6, 2015, which claims priority from U.S. Provisional Application Ser. No. 62/076,831, filed Nov. 7, 2014, all of which are herein incorporated by reference in their entireties.

BACKGROUND OF THE INVENTION

Various boat hulls designs are known in the art. Various designs may have RI certain advantages and disadvantages. Hulls with transverse steps have certain performance benefits and hulls with longitudinal steps generally have a softer ride and tend to be very stable.

Certain hull designs comprising a combination of transverse steps and longitudinal steps are known, such as for example, as described in U.S. Pat. No. 8,210,116 (Campbell et al.), which also discloses longitudinal "amas," also referred to as a "pair of outer side hulls," that cause entrapment of air under the hull. Designs with longitudinal retaining rails, amas or other longitudinal structures intended to "trap" (i.e. restrict transverse movement of) air and/or water under the hull are often referred to as "entrapment hulls."

There is, however, a continued desire in the art to design boat hulls that provide desired or optimal performance.

SUMMARY OF THE INVENTION

One aspect of the invention comprises a non-entrapment hull for a marine vessel, the hull comprising at least one longitudinally-vented transverse step. Each longitudinally-vented transverse step comprises a transverse step and one or more forward longitudinal step portions extending forward of and connected to at least one transverse step. The one or more forward longitudinal step portions define one or more longitudinal air pathways configured to feed air into the longitudinally-vented transverse step when the vessel is in motion on a body of water. Each longitudinal step portion has a cross-sectional profile that comprises a cutout into the hull relative to a line defined by a deadrise angle of the hull, the cutout comprising a vertical rise starting from the line defined by the deadrise angle and a run tilted outwardly upward at a non-horizontal angle less than the deadrise angle and that extends to an intersection with the line defined by the deadrise angle. The transverse step may extend from port to starboard. The hull may further comprise one or more longitudinal step tunnels and may have an exhaust bypass outlet aligned with the one or more longitudinal step tunnels.

Another aspect of the invention comprises a marine vessel hull having a plurality of longitudinally vented transverse steps, each longitudinally vented transverse step comprising a transverse step extending from starboard to port and one or more longitudinal step portions connected to and extending forward from the transverse step. The hull may have at least a first longitudinally vented transverse step located forward of a second longitudinally vented transverse step, and a first set of one or more longitudinal step portions connected to and extending forward from the first longitudinally vented transverse step, a second set of one or more longitudinal step portions connected to and extending forward from the second longitudinally vented transverse step, and a third set of one or more longitudinal step portions extending aft of the second longitudinally vented transverse step. Each of the first, second and third sets of longitudinal step portions may be longitudinally aligned with one another, such as to define a plurality of longitudinal steps with discontinuities introduced by the transverse steps.

Still another aspect of the invention comprises a marine vessel comprising at least one non-entrapment hull having at least one longitudinally -vented transverse step as is disclosed herein.

DETAILED DESCRIPTION OF THE INVENTION

One characteristic of the hull described herein is its exceptionally fast, efficient and stable ride. The hull comprises connected longitudinal and transverse steps referred to herein as "longitudinally-vented transverse steps." The use of longitudinally-vented transverse steps results in a very desirable ride.

Figure 9:
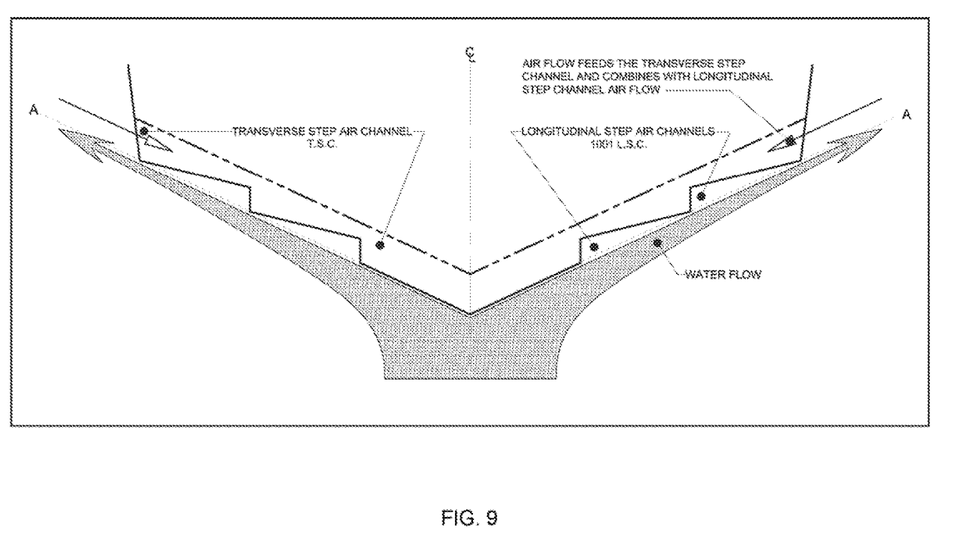
FIG. 9 is a cross sectional illustration depicting expected air and water pathways formed relative to the hull in the exemplary marine vessel of FIG. 8.

Longitudinally-vented transverse steps not only allow air to be channeled from the sides of the transverse steps but also rammed from the longitudinal steps forward of the transverse steps, thus greatly increasing air volume feeding into the transverse steps. Unlike longitudinal lifting strakes, which have cross-sectional profiles that extend laterally away from the line defined by the deadrise angle of the hull in cross section, longitudinal steps have cross-sectional profiles that comprise cutouts Into the hull relative to the line defined by the deadrise angle. These cutouts create a pocket for air flow. The two lines marked "A" in FIG. 9 depict what is meant by the "line defined by the deadrise angle of the hull" in the foregoing sentence. FIG. 9 is schematic in nature and is not intended to show all of the features that may or may not be present in some embodiments, such as chines or a keel pad structures. Longitudinal steps aft of a longitudinally vented transverse step may aid in directional tracking and provide an additional pathway for air fed from the longitudinally vented transverse step.

Figure 1:
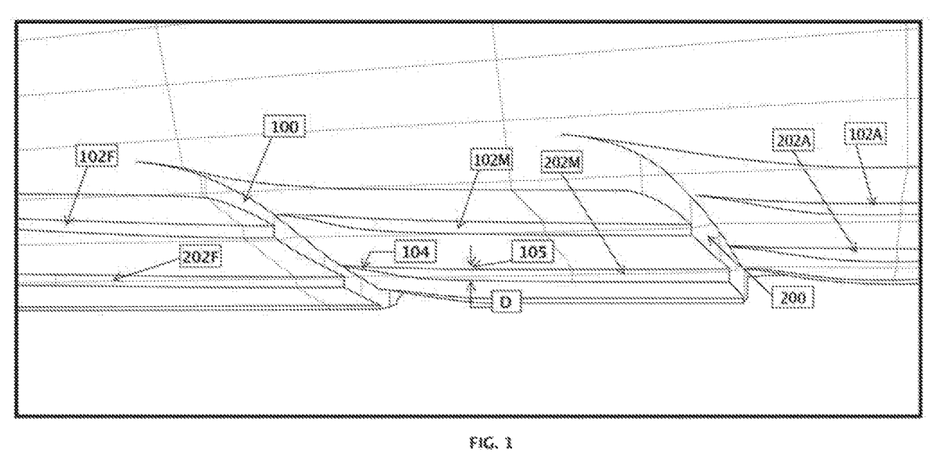
FIG. 1 is a 3D rendering depicting a portion of an exemplary boat hull embodiment having two transverse steps and two longitudinal steps viewed from a perspective on the port side and below the hull.
Figure 2:
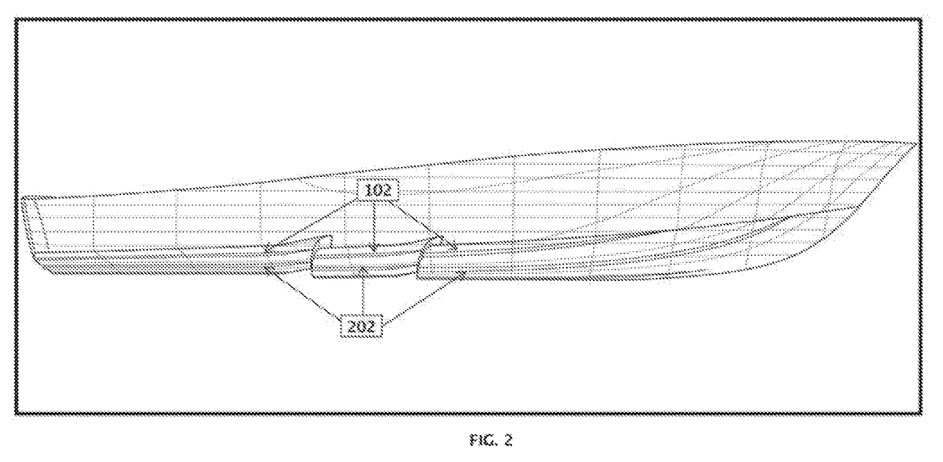
FIG. 2 is a 3D rendering depicting the exemplary boat hull embodiment of FIG. 1 viewed from a perspective on the starboard side, level with the hull.
Figure 3:
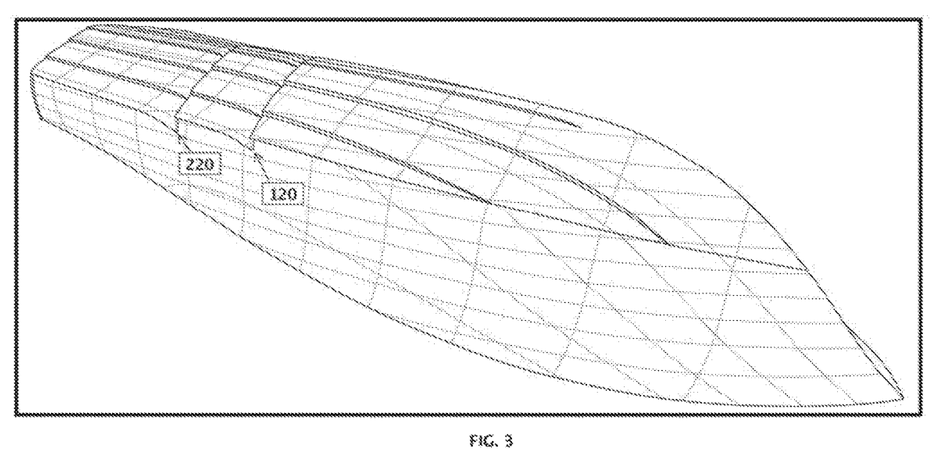
FIG. 3 is a 3D rendering depicting the exemplary boat hull embodiment of FIG. 1 viewed from a perspective on the port side, forward, and below the hull.
Figure 4:
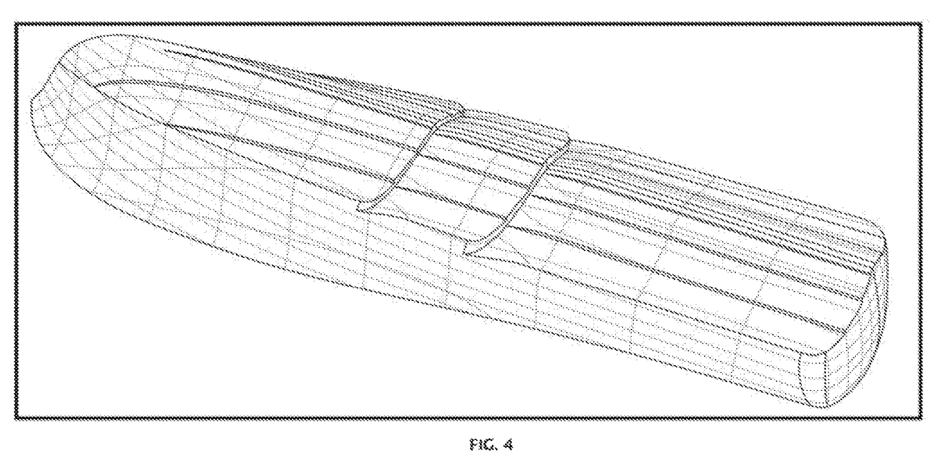
FIG. 4 is a 3D rendering depicting the exemplary boat hull embodiment of FIG. 1 viewed from a perspective on the starboard side, aft, and below the hull.

FIGS. 1-5 illustrate one embodiment of a 70' vessel, drawn and 3D-modeled s to scale, incorporating certain aspects of the invention. In the illustrated embodiment, the hull comprises two longitudinal steps, each longitudinal step comprising a forward portion, a middle portion, and an aft portion. The vessel hull depicted in FIG. 1 also comprises transverse steps 100, 200. In the embodiment depicted in FIG. 1, the longitudinal steps continue both forward and aft of discontinuities introduced by the two transverse steps 100 and 200. Thus, as depicted in FIG. 1, a first longitudinal step comprises longitudinal step portions 102F, 102M, and 102A, and a second longitudinal step comprises longitudinal step portions 202F, 202M, and 202A.

Thus, each longitudinally vented transverse step, as defined herein, comprises a transverse step, preferably extending side-to-side from port to starboard across the entire bottom of the hull, having at least one longitudinal step connected to and extending forward of that transverse step. The longitudinal step may optionally also extend aft of the transverse step. Thus, as shown and labeled in FIGS. 1-3, a first longitudinally vented transverse step 120 comprises transverse step 100 connected to longitudinal step sections 102F and 202F, and a second longitudinally vented transverse step 220 comprises transverse step 200 connected to longitudinal step sections 102M and 202M. Extension of the longitudinal steps aft of a transverse step, such as in sections 102A and 202A relative to step 200, may also be desirable, but is not required. Although depicted in FIG. 1 with two transverse steps, both of which comprise longitudinally vented transverse steps, it should be understood that in other embodiments with a plurality of transverse steps, fewer than all such transverse steps may be longitudinally vented transverse steps. Although depicted with a first (forward), second (midship), and third (aft) sets of longitudinal step portions, each set containing the same number (two) of longitudinal step portions, with the longitudinal steps in each set aligned with the steps in each other set so as to create two continuous longitudinal steps forward and aft of discontinuities introduced by the transverse steps, it should be understood that in other embodiments with multiple sets of longitudinal step portions, one or more sets may have fewer or more step portions than one or more other sets, and one or more sets may not be aligned with one or more of the other sets.

Figure 5:
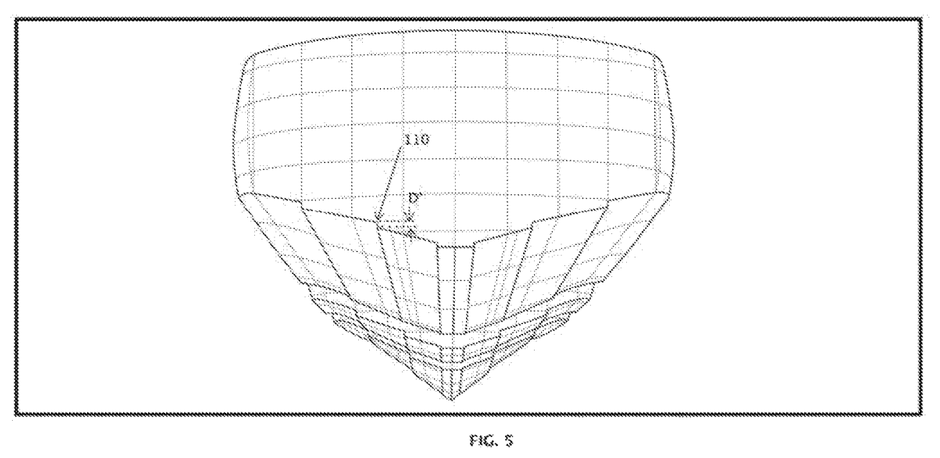
FIG. 5 is a 3D rendering depicting the exemplary boat hull embodiment of FIG. 1 viewed from a perspective at the aft of the stern and below the hull.

In one embodiment depicted herein, the longitudinal steps aft of the aft-most transverse step converge (i.e. their depth reduces in size) at the aft, meaning that they have a first, relatively-greater depth D (e. g. 4") in one portion of the vessel located forward of the aft, such as at point 105 shown in FIG. 1, and a second, relatively-lesser depth D' (e.g. 2") at the aft, such as at point 110 shown in FIG. 5. This creates more lift and buoyancy in the stern. Embodiments without such a convergence may also be desirable, as well as designs with longitudinal steps that grow deeper toward the transom.

The degree of extension forward of the longitudinal step associated with a :20 longitudinally vented transverse step is not limited to any particular length. In some embodiments, the longitudinal steps may converge forward to a zero depth, preferably along an "S" curve, such as to provide an air channel that is less restricted than would arise from continuing the longitudinal steps into, for example, the back side of the transverse step. The longitudinal steps may also be reintroduced gradually aft of the as discontinuity caused by each transverse step, rather than abutting the transverse step. For example, as shown in Fig. 1, aft of the first transverse step 100, the longitudinal step 202M commences at point 104 having no depth and gradually increases in depth to point 105, which is aft of point 104, at which point the longitudinal step reaches its full depth D.

Figure 8:
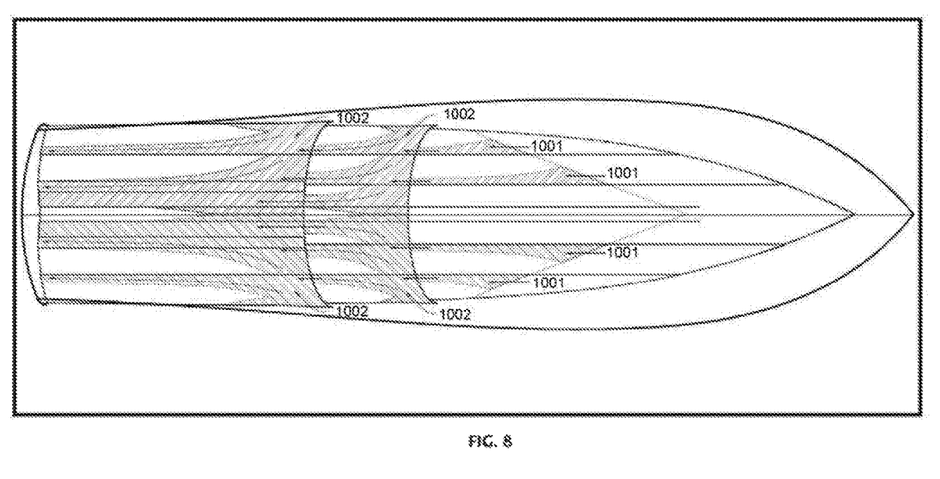
FIG. 8 is an underside plan view illustration of expected air pathways formed relative to the hull in an exemplary marine vessel in motion on a body of water, based upon modeled using computational flow dynamics (CFD) software.

As shown in FIG. 8, each transverse step and its connected one or more longitudinal steps that comprise a longitudinally vented transverse step defines a set of air pathways (longitudinal step air channels 1001) that feed air from the one or more longitudinal steps into the transverse step when the marine vessel is in motion on a body of water. The transverse step feeds the air into an air layer below the hull of the vessel aft of the transverse step. As depicted in FIG. 8, hatched areas illustrate the recesses in the hull formed by the longitudinally vented transverse steps that create pathways for air. Airflow on the hull aft of the aft-most longitudinally vented transverse step, as depicted in FIG. 8, is not limited to the hatched areas, however, as the large volume of air introduced by the longitudinally vented transverse step may be distributed over a much larger area. As illustrated in FIG. 8, the intersections between longitudinal step air pathways 1001 and transverse step air pathways 1002 are located inboard relative to the outboard edges of the transverse step air pathways at the sides of the vessel.

The hull depicted herein and in the priority documents associated with this application comprises a non-entrapment hull having no amas or retaining rails or other structures extending downward into the water relative to the line defined by the deadrise angle of the hull. This non-entrapment design, characterized by an absence of amas or rails, facilitates water flow having a transverse component that smoothly follows the hull along the deadrise line A in cross section, as shown in FIG. 9. An entrapment design, by contrast, by definition greatly restricts, if not eliminates entirely, any transverse component of the water flow relative to the hull. The non-entrapment design also permits air ventilation from the port and starboard into the transverse step air channels that is longitudinally unrestricted. By contrast, for example, the amas of the Campbell reference discussed above, require cutouts or partial step cutouts in the amas to provide ventilation, which cutouts are necessarily longitudinally restricted to the longitudinal dimension of the cutouts.

The non-entrapment design as described herein results in less vertical acceleration and pounding. By contrast, entrapment designs require energy to change direction of the air and water under the hull, which also creates noise. The non-entrapment design disclosed herein results in quieter, more efficient (less drag), and less pounding than an entrapment design. Surprisingly, in setting out to create a hull design that was primarily aimed to reduce vertical acceleration (pounding), the inventors found that that minimizing vertical acceleration also added to the efficiency and speed of the vessel, overall.

Although shown here as a combination of features, the invention is not limited to any particular combination. For example, the features of the longitudinally vented transverse steps as discussed herein may be applicable to any type of hull shape. Embodiments of the invention may include boat hulls having all of the described and depicted features or fewer than all of the described and depicted features. Although the embodiments depicted herein are devoid of lifting strakes, and the absence of lifting strakes may have certain advantages, such as reducing vertical acceleration and reducing the chattering, pounding and human and structural fatigue associated with such vertical acceleration, other embodiments may include designs having lifting strakes or any other appendage added to the hull.

Figure 6:
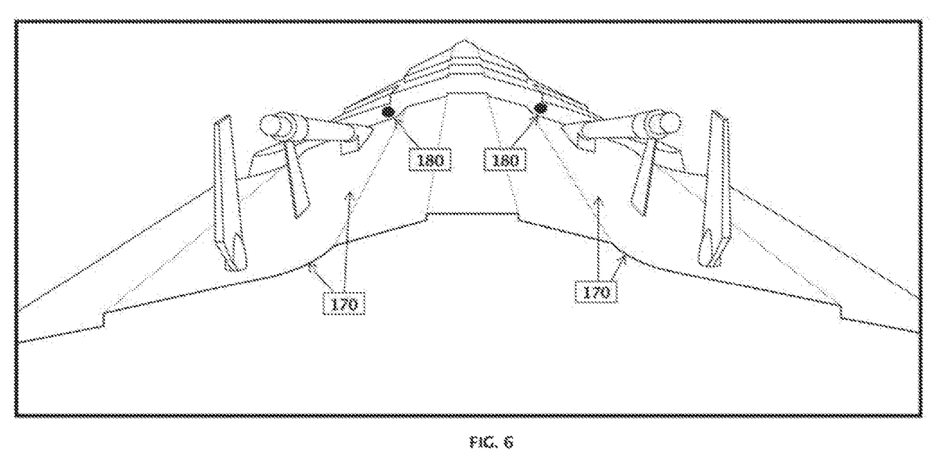
FIG. 6 is a 3D rendering depicting another exemplary boat hull embodiment inverted and viewed from aft of the stern.
Figure 7:
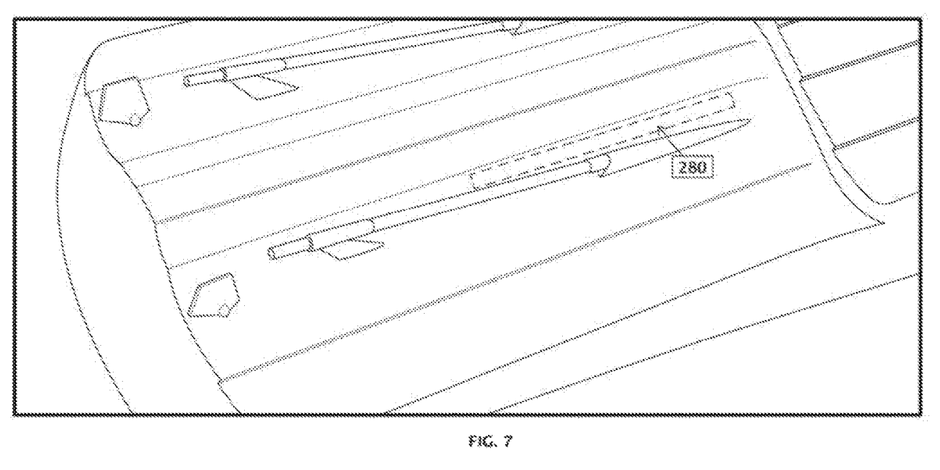
FIG. 7 is a 3D rendering depicting a portion of the exemplary boat hull embodiment of FIG. 6 viewed from a perspective an the port side, midship, and under the hull, looking forward.

In an embodiment depicted in FIGS. 6-8, the aft inboard longitudinal step may be carved out or scalloped to form a tunnel 170 for prop tip clearance and to ventilate the props from the aft transverse step as well as from the exhaust outlet. Such a "Longitudinal Step Tunnel" or LST feature 170 may be formed by scalloping out the aft inboard longitudinal step to reduce the shaft and/or allow for more prop tip clearance. In some embodiments, ventilation of the propellers may be desired prior to the boat getting on plane for maximizing engine horsepower and operation in an optimal region of the propeller demand curves. Placing exhaust bypass outlets 180, as depicted in FIG. 6, on the aft face of the aft transverse step directly in front of the LST, and/or in a location aft of aft transverse step but forward of propeller, such as in the general vicinity of area 280 shown in FIG. 7, may facilitate exhaust air travel along the LST to ventilate the props. At higher speeds, because the bypass is forward of propeller, the exhaust mixes with the air brought in by both the forward longitudinal and transverse steps, thereby minimizing or avoiding any need to regulate exhaust pressure or close the outlet, such as with a valve. It should be noted that although FIG. 7 depicts only a single area 280 on the one side of the vessel, a similar area is also located on the other side. Furthermore, although one type of exhaust bypass outlet is depicted in FIG. 6 and another type is depicted in FIG. 7, it should be understood that a vessel may comprise both types of outlets.

Thus, embodiments of the present invention may comprise combinations of all or fewer than all of the following features:
- at least one longitudinally vented transverse step (i.e. one or more longitudinal steps extending forward of o more transverse steps);
- one or more longitudinal steps extending aft of a transverse step;
- one or more longitudinal ending between a plurality of transverse steps;
- one or more of the longitudinal steps converging to a relatively lesser depth at the stern than a maximum depth fore of the stem,
- one or more of the longitudinal steps gradually transitioning to a maximum depth aft of a transverse step from a discontinuity introduced by the transverse step;
- one or more longitudinal step tunnels; and
- one or more exhaust bypass outlets on an aft face of an aft-most transverse step or on a surface aft of the aft most transverse step and forward of the propeller aligned with the one or more longitudinal step tunnels.

Although the embodiments depicted herein comprise a combination of two longitudinally vented transverse steps having all of the above features, the invention is not limited to such a combination. In particular, some embodiments may have fewer or more than two longitudinal steps associated with a longitudinally vented transverse step, a different number of longitudinal steps or longitudinal step portions associated with each of a plurality of longitudinally vented transverse steps, fewer or more than two longitudinally vented transverse steps, or fewer longitudinally vented transverse steps than the total number of transverse steps.

In particular, vessels having at least one longitudinally vented transverse step may or may not have one or more of the other features listed above. While all of the above features may enhance the performance of a vessel, embodiments with fewer than all of the above feature may also be provided and the absence of certain features may have certain advantages in certain applications.

The boat hull designs as discussed herein may be incorporated into any type of marine vessel, but may be particularly well suited for use in sport fishing, military or performance vessels. The term marine vessel refers to any boat, yacht, or the like that is designed for travel on the surface of a body of water, including even vessels not designed for constant contact with water, such as for example, seaplanes. Similarly, the term hull refers to the portion of any such vessel that typically makes contact with the water when the vessel is normally operating in water.

The embodiments illustrated herein also depict an exemplary chine spray rail 500 incorporated into the hull bottom, as best shown in FIG. 5. Unlike a level or down-angle flat chine that may force water to abruptly change directions and/or atomize the water to make it airborne, either of which may wet otherwise dry portions of the boat, the chine depicted in the illustrations features a large fillet that is level on the outboard edge. This shape allows the water to leave the hull out and down in thick sheets unmolested by a rapid change in direction. Also, a chine with no down angle may cause water to exit the chine cleanly without getting trapped by the spray rail, which trapping may cause excessive pounding and slapping. Other embodiments may include other chine designs, including but not limited to reverse or hard flat chines.

Figure 10:
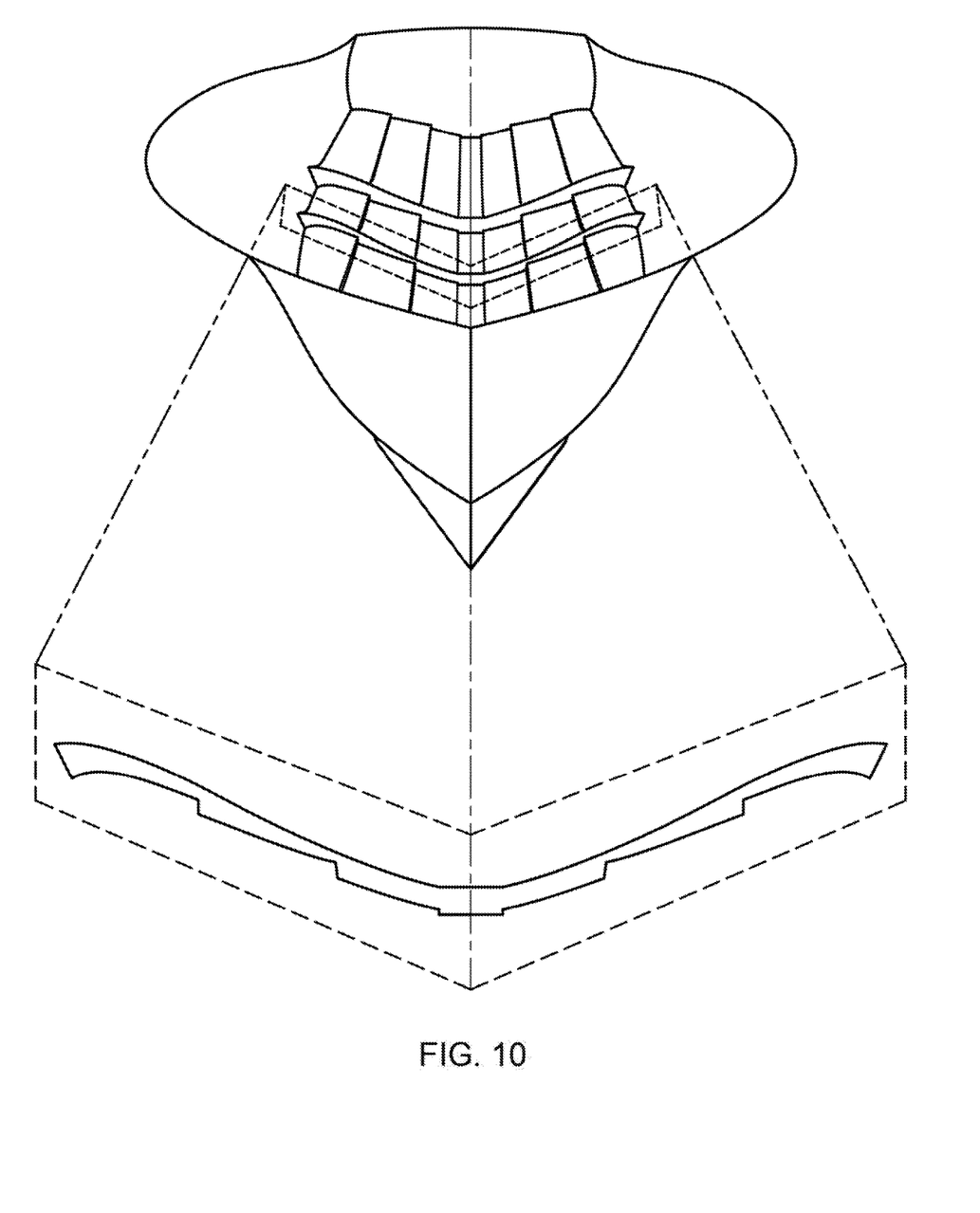
FIG. 10 is a 3D rendering depicting the exemplary boat hull embodiment of FIG. 1 viewed from a perspective at the bow looking into the hull, showing in projected cross-section a highlighted portion of the hull.

As best depicted in FIG. 10, the embodiments illustrated herein also comprise an inverted bell section bottom that transitions to a convex shape at the transom. The embodiments illustrated herein also show a keel pad. Other embodiments may feature differently shaped bottoms and may or may not have a keel pad.

Although illustrated herein in connection with a single hulled vessel, it should be understood that the hull design generally disclosed herein may be appropriate for use in connection with a multi-hull vessel, such as without limitation, a catamaran, a trimaran, or a vessel with any number of hulls known in the field in which each hull is separate and distinct from one another. When used in connection with a multi-hulled vessel, each of the multiple hulls may be identical and symmetrical, or each of the hulls may be different and asymmetrical relative to one another. For example, in a catamaran, each hull may comprise a mirror image of one another, such as a first hull essentially comprising the port half of the design of a single hull as illustrated herein, and a second hull comprising essentially the starboard half. In multi-hulled designs, each of the hulls retains its non-entrapment design. The area between the hulls, however, may or may not have an entrapment design.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A marine vessel hull having a fore, aft, port, and starboard, the hull comprising a non-entrapment configuration having:
at least one longitudinally-vented transverse step, each longitudinally-vented transverse step comprising:
a transverse step; and
one or more forward longitudinal step portions connected to and extending forward from the transverse step, each longitudinal step portion defining a longitudinal air pathway configured to feed air into the longitudinally-vented transverse step when the hull is in motion on a body of water, each transverse step defining a plurality of longitudinally unrestricted transverse step air pathways configured to ventilate the at least one longitudinally-vented transverse step from the port and starboard when the vessel is in motion on a body of water, each longitudinal step portion having a cross-sectional profile that comprises a cutout into the hull relative to a line defined by a deadrise angle of the hull, the cutout comprising a vertical rise starting from the line defined by the deadrise angle and a run tilted outwardly upward at a non-horizontal angle less than the deadrise angle and that extends to an intersection with the line defined by the deadrise angle; and
one or more aft longitudinal step portions extending aft of the at least one longitudinally-vented transverse step.

2. The marine vessel hull of claim 1, wherein the transverse step of the at least one longitudinally-vented transverse step extends from starboard to port across a bottom of the hull.

3. The marine vessel hull of claim 1, wherein each of the one or more aft longitudinal step portions converges to a relatively lesser depth at the stern than a maximum depth at a location fore of the stern.

4. The marine vessel hull of claim 3, wherein each of the one or more aft longitudinal step portions gradually transitions to the maximum depth aft of each transverse step from a discontinuity introduced by the transverse step.

5. The marine vessel hull of claim 1 comprising at least two longitudinally-vented transverse steps, including a first longitudinally-vented transverse step located forward of a second longitudinally-vented transverse step.

6. The marine vessel hull of claim 5, comprising a first set of one or more forward longitudinal step portions connected to and extending forward from the first transverse step and a second set of one or more forward longitudinal step portions connected to and extending forward from the second transverse step and a third set of one or more aft longitudinal step portions extending aft of the second transverse step.

7. The marine vessel hull of claim 6, wherein each of the first, second and third sets of longitudinal step portions are longitudinally aligned with one another such as to define a plurality of otherwise continuous longitudinal steps extending forward of the first transverse step to aft of the second transverse step but for discontinuities introduced by the transverse steps.

8. The marine vessel of claim 7, wherein the at least two longitudinal steps are parallel to one another.

9. The marine vessel hull of claim 7, wherein each of the first, second and third sets of longitudinal step portions comprise at least two longitudinal step portions.

10. The marine vessel hull of claim 1, wherein the one or more forward longitudinal step portions define at least two longitudinal steps.

11. The marine vessel hull of claim 1 further comprising an exhaust bypass outlet on an aft face of an aft-most transverse step or on a surface aft of the aft-most transverse step, forward of the propeller, and aligned with one or more scalloped regions.

12. The marine vessel hull of claim 1, wherein hull is devoid of lifting strakes.

13. The marine vessel hull of claim 1, further comprising a starboard chine and a port chine each comprising a fillet that is level on an outboard edge thereof.

14. The marine vessel hull of claim 1, wherein the at least one longitudinally-vented transverse step consists of two longitudinally-vented transverse steps and the one or more forward longitudinal step portions consists of two longitudinal step portions.

15. The marine vessel hull of claim 1, wherein the hull has an inverted bell section bottom at the fore that transitions to a convexly shaped transom at the stern.

16. The marine vessel of claim 15, wherein the vessel comprises only a single hull.

17. The marine vessel of claim 15, wherein the vessel comprises more than one hull.

18. A marine vessel comprising at least one marine vessel hull of claim 1.

19. A marine vessel hull having a fore, aft, port, and starboard, the hull comprising a non-entrapment configuration having:
at least one longitudinally-vented transverse step, each longitudinally-vented transverse step comprising:
a transverse step; and
one or more forward longitudinal step portions connected to and extending forward from the transverse step, each longitudinal step portion defining a longitudinal air pathway configured to feed air into the longitudinally-vented transverse step when the hull is in motion on a body of water, each transverse step defining a plurality of longitudinally unrestricted transverse step air pathways configured to ventilate the at least one longitudinally-vented transverse step from the port and starboard when the vessel is in motion on a body of water, each longitudinal step portion having a cross-sectional profile that comprises a cutout into the hull relative to a line defined by a deadrise angle of the hull, the cutout comprising a vertical rise starting from the line defined by the deadrise angle and a run tilted outwardly upward at a non-horizontal angle less than the deadrise angle and that extends to an intersection with the line defined by the deadrise angle;
one or more aft longitudinal step portions extending aft of the at least one longitudinally-vented transverse step
each longitudinal step portion extending forward from the at least one longitudinally-vented transverse step longitudinally aligned with a corresponding longitudinal step portion extending aft of the at least one longitudinally-vented transverse step such as to define an otherwise continuous longitudinal step extending forward and aft of the longitudinally-vented transverse step but for a discontinuity introduced by the longitudinally-vented transverse step.

20. The marine vessel of claim 19, wherein the transverse step of the at least one longitudinally-vented transverse step extends from starboard to port across a bottom of the hull.

21. The marine vessel of claim 19, comprising only one longitudinally-vented transverse step and only one otherwise continuous longitudinal step but for the discontinuity introduced by the longitudinally-vented transverse step on each of the port and starboard.

* * * * *